June 19, 1934.  A. R. PRIBIL  1,963,592

STEEL TROLLEY WHEEL

Filed Feb. 26, 1932

INVENTOR.
Alexis R. Pribil.
BY Frank C. German
ATTORNEY.

Patented June 19, 1934

1,963,592

UNITED STATES PATENT OFFICE 1,963,592

STEEL TROLLEY WHEEL

Alexis R. Pribil, Saginaw, Mich.

Application February 26, 1932, Serial No. 595,332

2 Claims. (Cl. 308—190)

This invention relates to trolley wheels, and more especially to a wheel of simple and substantial construction, which can be readily manufactured and assembled.

Another object is to design a trolley wheel and provide means for locking the parts in proper assembled relation, said means also permitting the riveting of the wheel to the trolley bracket before it is inserted.

A further object is to design a dust-proof ball bearing, trolley wheel, the ball races of which are heat treated and coined, so that accurate alignment is provided, insuring smooth and concentric free rolling of the wheel.

With these and other objects in view, my invention comprises novel features of construction, which, in a preferred embodiment of the invention, will be hereinafter described, and the scope of the invention will then be defined in the appended claims.

In the drawing—

Figure 2:
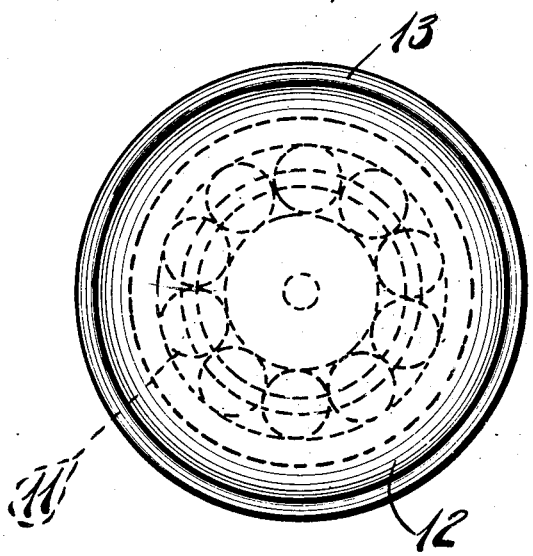
Fig. 2 is an end view.
Figure 1:
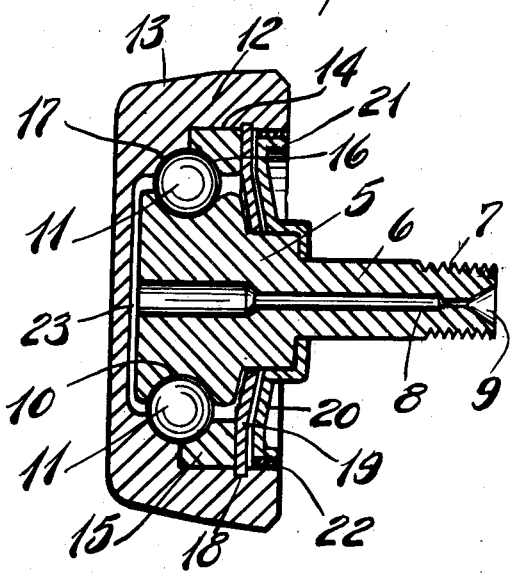
Fig. 1 is a sectional view of my improved trolley wheel.

In Figs. 1 and 2 of the annexed drawing, I have shown the preferred embodiment of my invention. This comprises a hub 5, having a stem 6 formed integral therewith, the end being threaded as shown at 7 to receive a nut or the like; a centrally disposed passage 8 is provided in said hub and stem, the outer end being flared as shown at 9 so that a suitable grease gun may be applied thereto.

A ball groove 10 is provided in the outer periphery of the hub, and a plurality of anti-friction elements such as balls 11 are mounted therein.

The outer wheel or shell portion 12 is formed as clearly shown in Fig. 1 of the drawing, with the outer face closed, the tread 13 being angled to suit the flange of the I-beam, channel, or track on which the wheel is adapted to roll. The inner face of the shell is recessed as shown at 14, and is adapted to accommodate an insert 15, the section 16 of said insert being shaped to conform to the contour of the anti-friction elements, as is also the section 17 of the wheel.

It is, of course, necessary to secure the insert in assembled position, and I, therefore, form a groove 18 in the recess at a point directly adjacent the outer edge of the insert, and a disk or member 19 is then pressed or sprung into said groove, thereby securely locking the various members in assembled position, a similar disk 20 fitting over the hub, and the outer edge is turned as shown at 21 so that a seal 22 is provided at this point.

Lubrication is effected through the passage 8, the end of the hub being spaced from the face of the wheel shell and forming a chamber 23 which is open to the anti-friction balls 11, so that lubricant may be supplied thereto.

Figure 4:
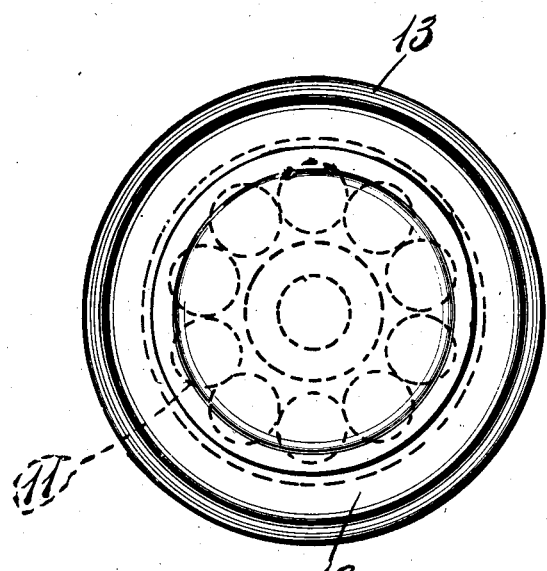
Fig. 4 is an end view thereof.
Figure 3:
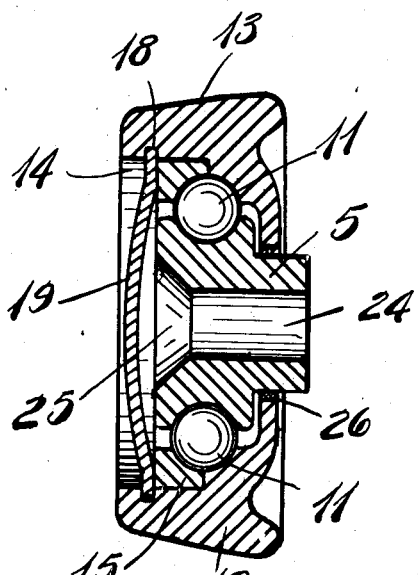
Fig. 3 is a sectional view showing an alternate construction.

In Figs. 2 and 3 of the drawing, I have shown an alternate or modified construction. In this design the hub 5 is formed with a centrally disposed opening 24, counterbored as shown at 25 to accommodate a bolt or rivet (not shown); a ball groove is provided as in the first described construction, the front face is, however, open and recessed as at 14, and the insert 15 is identical as is also the groove 18, a yieldable disk or member 19 being applied as above described.

The back face of the wheel shell is also provided with a centrally disposed opening to accommodate the end of the hub 5, and a labyrinth seal 26 forms a dust and leak-proof joint with the hub.

The wheel is well balanced, and the entire shell is carbonized and hardened, the ball races are coined, and the construction in general is rugged and substantial.

From the foregoing description it will be obvious that I have perfected a very simple, practical, and sturdy steel wheel, which can be readily manufactured and assembled, which is leak and dust-proof, and which is economical to manufacture and assemble.

What I claim is:

1. A trolley wheel comprising a hub, a shell surrounding said hub, one face being recessed to receive and nest an insert, anti-friction balls interposed between said hub, and the shell and insert, and a yieldable crowned disk member mounted in said recessed portion for securing said insert in position, and a turned disk member also mounted in said recess and forming a leak and dust-proof closure for the face of the wheel.

2. A trolley wheel comprising a shell having a shouldered recess provided in one face thereof, a hub projecting into said recess and having a stem formed integral therewith, an insert adapted to be nested in said recess, balls interposed between the hub and the shell and insert, a chamber at the end of the hub and open to said ball groove, a lubricant passage opening into said chamber, resilient means secured in facial contact with the insert for locking it in assembled relation, and a disk having a turned outer edge fitted in said recess and forming a leakproof and dustproof closure for said face.

ALEXIS R. PRIBIL.